(12) United States Patent
Ryun et al.

(10) Patent No.: US 10,319,397 B2
(45) Date of Patent: Jun. 11, 2019

(54) NARROW BAND DWELL MONITORING

(71) Applicant: Seagate Technology LLC, Cupertino, CA (US)

(72) Inventors: Scott E. Ryun, Victoria, MN (US); Brian R. Pollock, Eden Prairie, MA (US); Ryan Todd Lyle, Prior Lake, MN (US); Ryan Thomas Herbison, Minneapolis, MN (US); Richard Arthur Herr, Eden Prairie, MN (US); Paul W. Burnett, Minneapolis, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/971,158

(22) Filed: May 4, 2018

(65) Prior Publication Data

US 2018/0336921 A1    Nov. 22, 2018

Related U.S. Application Data

(60) Provisional application No. 62/508,751, filed on May 19, 2017.

(51) Int. Cl.
*G11B 5/725* (2006.01)
*G11B 5/265* (2006.01)
*G11B 5/455* (2006.01)
*G11B 5/60* (2006.01)

(52) U.S. Cl.
CPC ............ *G11B 5/2655* (2013.01); *G11B 5/455* (2013.01); *G11B 5/725* (2013.01); *G11B 5/2657* (2013.01); *G11B 5/60* (2013.01); *G11B 5/6005* (2013.01)

(58) Field of Classification Search
None
See application file for complete search history.

(56) References Cited

U.S. PATENT DOCUMENTS

| | | | | |
|---|---|---|---|---|
| 4,626,941 A * | 12/1986 | Sawada | ................ | G11B 23/507 360/135 |
| 4,789,913 A * | 12/1988 | Gregory | ............... | G11B 23/505 360/69 |
| 5,309,301 A * | 5/1994 | Gregory | ................. | G11B 17/32 360/137 |
| 6,678,113 B2 | 1/2004 | Feliss et al. | | |

(Continued)

*Primary Examiner* — Tan X Dinh
(74) *Attorney, Agent, or Firm* — Holzer Patel Drennan

(57) ABSTRACT

Narrow band dwell occurs when air bearings corresponding to a set of read and/or write heads within a hard disc drive remain within a fixed narrow band of one or more storage platters for an extended period of time. The air bearings displace lubricant on the storage platters and may redeposit the lubricant as droplets on the platters. The presently disclosure technology is directed to monitoring a hard disc drive for narrow band dwell, and in some implementations, implementing operations to mitigate narrow band dwell. More specifically, the presently disclosure technology may detect an overflying air-bearing slider position, apply a lubrication film displacement formula to a narrow band of the storage platter, apply a lubrication film reflow formula to one or more other narrow bands of the storage platter, and track lubrication film thickness over time in each of the narrow bands of the storage platter.

20 Claims, 5 Drawing Sheets

(56) References Cited

U.S. PATENT DOCUMENTS

| | | | | |
|---|---|---|---|---|
| 6,760,175 B2* | 7/2004 | Smith | ................... | G11B 5/5526 |
| | | | | 360/128 |
| 6,853,508 B2* | 2/2005 | Smith | ...................... | G11B 5/41 |
| | | | | 324/210 |
| 6,900,957 B2 | 5/2005 | Gillis et al. | | |
| 7,271,976 B2* | 9/2007 | Ishii | ...................... | G11B 5/5547 |
| | | | | 360/75 |
| 7,817,370 B2* | 10/2010 | Cromer | ................... | G11B 15/03 |
| | | | | 360/59 |
| 8,184,397 B2* | 5/2012 | Kato | .................... | G11B 33/148 |
| | | | | 360/99.18 |
| 8,817,413 B1* | 8/2014 | Knigge | ................ | G11B 5/6005 |
| | | | | 360/75 |
| 2001/0043438 A1* | 11/2001 | Gui | ......................... | G11B 5/60 |
| | | | | 360/236.6 |
| 2011/0141607 A1* | 6/2011 | Ramamoorthy | ..... | G11B 5/6005 |
| | | | | 360/75 |
| 2012/0229933 A1* | 9/2012 | Ma | ....................... | G11B 5/6082 |
| | | | | 360/234.1 |

* cited by examiner

NARROW BAND DWELL MONITORING

CROSS-REFERENCE TO RELATED APPLICATIONS

The present application claims benefit of priority to U.S. Provisional Patent Application No. 62/508,751, entitled "Narrow Band Dwell Monitoring" and filed on 19 May 2017, which is specifically incorporated by reference herein for all that it discloses or teaches.

BACKGROUND

A potential failure mode for hard disc drives is known as narrow band dwell. Narrow band dwell occurs when air bearings corresponding to a set of read and/or write heads within a hard disc drive remain within a fixed narrow band of one or more storage platters of the hard disc drive for an extended period of time. Over time, the air bearing displaces lubricant on the storage platter surface(s) and may redeposit the lubricant as droplets on the platter(s). As the lubricant layer reduces friction and wear on the platter(s) and distributes thermal energy, displacement of the lubricant layer may lead to premature drive failure, particularly in the event of an inadvertent failure of the air bearing(s).

SUMMARY

Implementations described and claimed herein address the foregoing problems by providing a method for monitoring narrow band dwell within a hard disc drive. The method includes detecting an overflying air-bearing slider position with respect to a storage platter below the air-bearing slider, applying a lubrication film displacement formula to a narrow band of the storage platter below the overflying air-bearing slider, applying a lubrication film reflow formula to one or more other narrow bands of the storage platter away from the air-bearing slider, and tracking lubrication film thickness over time in each of the narrow bands of the storage platter based on the applied displacement and reflow formulae.

Implementations described and claimed herein further address the foregoing problems by further providing a hard disc drive including a storage platter, an air-bearing slider, and a narrow band dwell monitor. The narrow band dwell monitor detects an overflying air-bearing slider position with respect to a storage platter below the air-bearing slider, applies a lubrication film displacement formula to a narrow band of the storage platter below the overflying air-bearing slider, applies a lubrication film reflow formula to one or more other narrow bands of the storage platter away from the overflying air-bearing slider, and tracks lubrication film thickness over time in each of the narrow bands of the storage platter based on the applied displacement and reflow formulae.

Implementations described and claimed herein still further address the foregoing problems by still further providing one or more computer-readable storage media encoding computer-executable instructions for executing on a computer system a computer process that monitors narrow band dwell in a hard disc drive. The computer process includes detecting an overflying air-bearing slider position with respect to a storage platter below the air-bearing slider, applying a lubrication film displacement formula to a narrow band of the storage platter below the overflying air-bearing slider, applying a lubrication film reflow formula to one or more other narrow bands of the storage platter away from the air-bearing slider, and tracking lubrication film thickness over time in each of the narrow bands of the storage platter based on the applied displacement and reflow formulae.

Other implementations are also described and recited herein. This Summary is provided to introduce a selection of concepts in a simplified form that are further described below in the Detailed Descriptions. This Summary is not intended to identify key features or essential features of the claimed subject matter, nor is it intended to be used to limit the scope of the claimed subject matter.

BRIEF DESCRIPTIONS OF THE DRAWINGS

DETAILED DESCRIPTIONS

The presently disclosed technology is directed to monitoring a hard disc drive for narrow band dwell, and in some implementations, implementing operations to mitigate negative effects of narrow band dwell on the hard disc drive.

Figure 1:
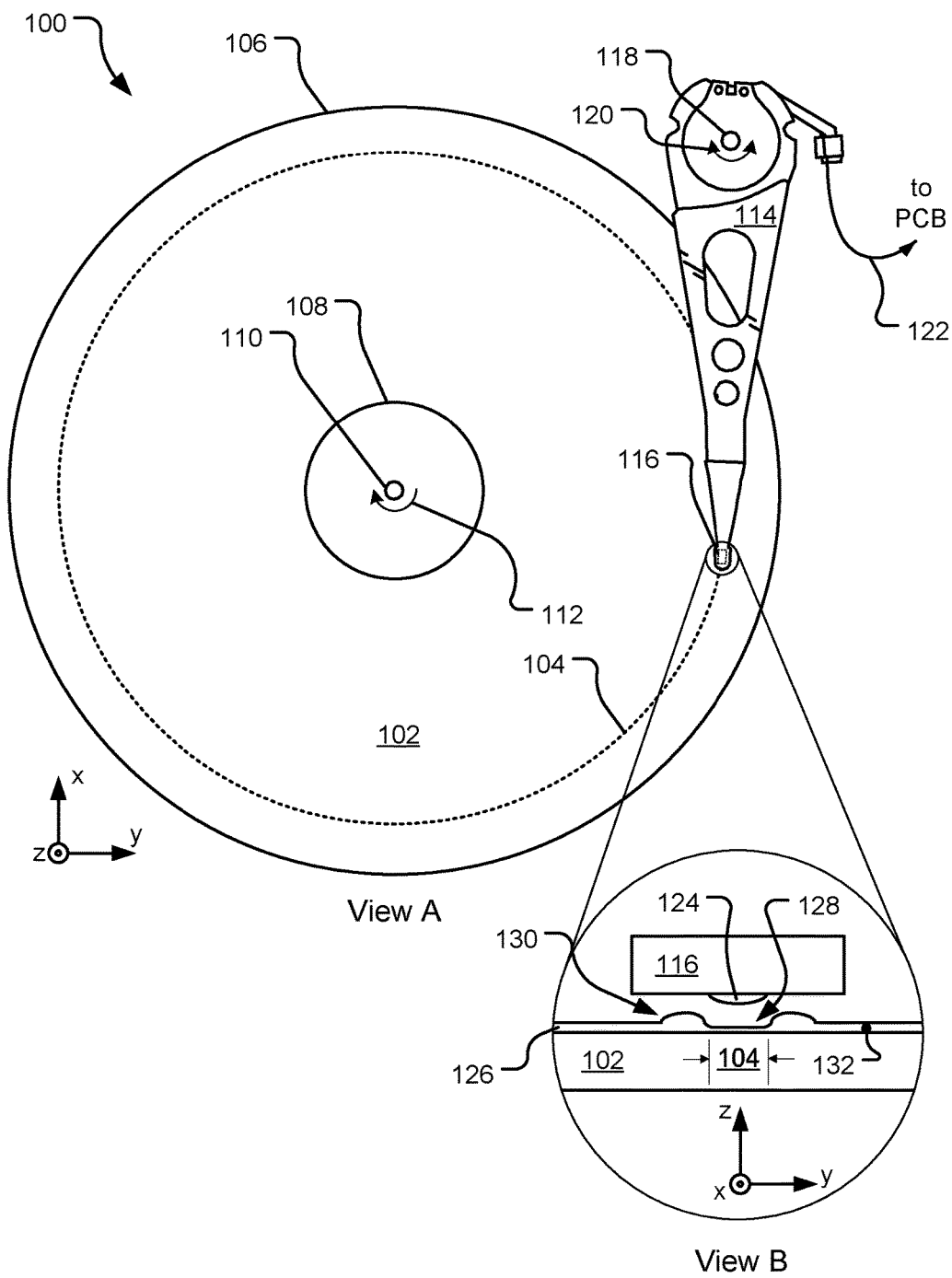
FIG. 1 illustrates an example disc drive assembly including a storage platter with lubrication depletion along a narrow band of the storage platter.

FIG. 1 illustrates an example disc drive assembly 100 including a storage platter (or disc) 102 with lubrication depletion along a narrow band 104 (illustrated by a dotted circle) of the storage platter 102. The narrow band 104 is one of a series of adjacent concentric narrow bands making up an entirely of the readable and/or writable surface area of the storage platter 102. Further, the narrow bands may be logical divisions of the storage platter 102 without any physical demarcation. Narrow bands are defined herein as sets of adjacent tracks that equal the width of a high-pressure region under a center pad (not shown) of air-bearing slider 116. For simplification, the narrow band width may equal the width of the center pad of the slider 116 and may be expressed as a number of adjacent tracks that form the narrow band. Referring specifically to View A (illustrating the assembly 100 in the x-y plane), the storage platter 102 includes an outer diameter 106 and an inner diameter 108 between which are a number of substantially circular concentric data tracks. The storage platter 102 rotates at high speed about platter spindle 110 (as illustrated by arrow 112) as information is written to and/or read from the data tracks on the storage platter 102.

Information may be written to and read from the storage platter 102 via actuator arm 114 and the slider 116. The actuator arm 114 pivots about actuator spindle 118 using a servo motor (not shown) during a seek operation to locate a desired data track and sector on the storage platter 102, as illustrated by arrow 120. Specific locations on the storage platter 102 may defined by any available addressing scheme (e.g., cylinder-head-sector (CHS) addressing and logical block addressing (LBA) schemes). The actuator arm 114 extends toward the storage platter 102 and the slider 116 is located at an end of the actuator arm 114 distal from the actuator spindle 118. The slider 116 flies in close proximity above the storage platter 102 while reading data from and/or writing data to the storage platter 102.

More specifically, the storage platter 102 includes an array of embedded independent magnetic domains and the slider 116 includes an array of microelectronic components (e.g., a read element, a write element, thermal actuators, other head-media spacing micro-actuators, etc., not shown). The read element is magneto-resistive, which allows it to read data from the magnetic domains as they pass underneath the read element. The write element generates a magnetic field that selectively changes polarity of the magnetic domains of the storage platter 102 as they pass underneath the write element, which allows the write element to write data to the storage platter 102. A flex cable 122 provides electrical connection paths from a printed circuit board (PCB, not shown) to the various microelectronic components attached to the actuator arm 114 and the slider 116. The flex cable 122 transmits data signals from the read element and/or to the write element, while allowing pivotal movement of the actuator arm 114 during operation. The flex cable 122 may be routed along the actuator arm 114 from the PCB to the slider 116.

A trailing edge view of the slider 116 is shown in detail in View B (y-z plane) of FIG. 1 and includes a protruding pole tip 124. The protruding pole tip 124 may be associated with the read element, the write element, or another electronic component mounted to the trailing edge of the slider 116. In some implementations, the slider 116 also includes one or more head-media spacing micro-actuators, such as thermal actuators (or heaters) that protrude the read element during read operations and/or the write element during write operations, causing the pole tip 124 to protrude from the slider 116. More specifically, a read element micro-actuator may vary a distance the read element protrudes from the slider 116 toward the storage platter 102 to fine tune a clearance between the read element and the storage platter 102. Similarly, the write element micro-actuator may vary a distance the write element protrudes from the slider 116 toward the storage platter 102 to fine tune a clearance between the write element and the storage platter 102.

The storage platter 102 includes a thin lubrication layer 126 that serves to smooth any irregularities in the storage platter 102 surface (referred to herein as asperities) and distribute thermal energy to the storage platter 102 created when the slider 116 flies in close proximity above the storage platter 102. However, as the thin lubrication layer 126 is a viscous fluid, it is displaced over time by a pressure differential and shear forces created by airflow between the slider 116 and the storage platter 102. As a result, the lubrication layer 126 may be displaced from the narrow band 104 and redeposited outside the narrow band 104 if the slider 116 flies over the narrow band 104 for a sufficient amount of time (referred to herein as narrow band dwell), which results in varying lubrication layer 126 thickness across adjacent narrow bands of the storage platter 102. Further, the lubrication layer 126 may be picked up by the slider 116, transported, and redeposited as the slider 116 flies over the storage platter 102, which results in varying lubrication layer 126 thickness within the narrow band 104.

For example, the lubrication layer 126 may be pushed from the narrow band 104 creating a depleted region 128, while the displaced lubricant creates areas of increased thickness (e.g., thickened region 130) in adjacent narrow bands of the storage platter 102. Varying lubrication layer 126 thickness (either within the narrow band 104 or across adjacent narrow bands) may affect read/write performance of the drive assembly 100. Further, a reduced thickness lubrication layer 126 is less effective at distributing thermal energy to the storage platter 102, which may create hot spots on one or both of the storage platter 102 and the slider 116, which may in turn further reduce overall longevity and reliability of the drive assembly 100.

Finally, the storage platter 102 may contain asperities, which are defined herein as any variations from a planar read/write surface of the storage platter 102. These variations include defects (e.g., sputtering anomalies) in the storage platter 102 surface and contaminates located on the storage platter 102 surface. The asperities include protruding asperities (e.g., asperity 132), recessed asperities, or areas of increased surface roughness (e.g., rapidly changed protrusions and recessions inconsistent with typical surface roughness of the storage platter 102). Often, the asperities are concealed by the lubrication layer 126, but may be revealed when the lubrication layer 126 is displaced, causing increased risk of contact with the asperities when the slider 116 flies over the storage platter 102. Such contact may reduce overall longevity and reliability of the drive assembly 100.

In various implementations, there may be more than one pole tip protruding from the slider 116, though only one is depicted in FIG. 1. There may also be more than one slider, actuator arm, and/or storage platter within the disc drive assembly 100, though only one of each aforementioned component of the assembly 100 is depicted in FIG. 1. Further, appearances of the slider 116 and other features of assembly 100 are for illustration purposes only and are not drawn to scale. The various microelectronic components attached to the slider 116 may be referred to in total as a transducer head. The presently disclosed technology may apply to storage drive assemblies other than the disc drive assembly 100 depicted in FIG. 1. For example, the presently disclosed technology may be used to monitor for narrow band dwell and/or implement mitigation operations to reduce negative effects of narrow band dwell on non-magnetic storage media.

Figure 2:
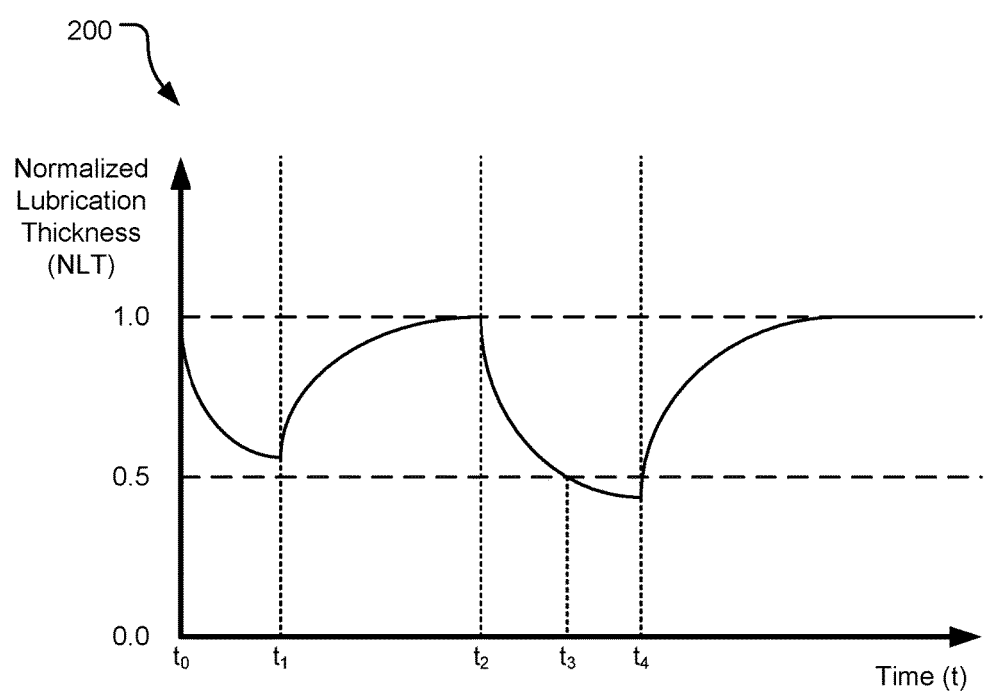
FIG. 2 illustrates an example lubrication depletion and reflow model corresponding to a narrow band of a storage platter.

FIG. 2 illustrates an example lubrication depletion and reflow model 200 corresponding to a narrow band of a storage platter. The storage platter includes a thin lubrication layer that serves to smooth any irregularities in the storage platter surface (referred to herein as asperities) and distribute thermal energy to the storage platter created when a slider flies in close proximity above the storage platter. As the thin lubrication layer is a viscous fluid, it is displaced over time by downward forces created by airflow between the slider and the storage platter. As a result, the lubrication layer may be displaced from the narrow band and redeposited outside the narrow band if the slider flies over the narrow band for a sufficient amount of time (referred to herein as narrow band dwell). This results in the depicted time-dependent estimated lubrication layer thickness within the narrow band of the storage platter.

Similar time-dependent estimated lubrication depletion and reflow models may be created for all of an array of narrow bands of the storage platter, which would illustrate time-dependent lubrication layer thickness across adjacent bands of the storage platter. While the lubrication depletion and reflow model 200 is depicted in a graphical format for illustration purposes, the lubrication depletion and reflow model 200 may be implemented in practice without a graphical output by applying lubrication depletion and lubrication reflow formulae to monitor lubrication layer thickness over time.

Specifically, the lubrication depletion and reflow model 200 illustrates normalized lubrication thickness (NLT) plotted over time (t). The normalization of the NLT defines "free" or "mobile" lubrication that is able to be displaced, while disregarding lubrication that not able to be displaced by expected pressure differentials and shear forces imposed on the storage platter. On the y-axis, the NLT includes 1.0 corresponding to an expected lubrication thickness on the storage platter without any depletion, 0.5 corresponding to a minimum acceptable lubrication thickness on the storage platter to sustain acceptable drive reliability, and 0.0 corresponding to a lack of any substantial displaceable lubrication on the storage platter. In some implementations, 0.4-0.6 corresponds to somewhat depleted displaceable lubrication, while less than 0.4 corresponds to severely depleted displaceable lubrication.

On the x-axis, time period $t_0$ to $t_1$ illustrates a period in which the slider is flying over the narrow band of the storage platter corresponding to model 200 and depleting the lubrication layer thickness. The lubrication layer thickness is depleted from an expected lubrication thickness without any depletion to a depleted state above the minimum acceptable lubrication thickness on the storage platter. Time period $t_1$ to $t_2$ illustrates a period in which the slider is not flying over the narrow band, thereby permitting the lubrication layer to reflow over the narrow band to achieve a state where the lubrication layer is approximately restored to the expected lubrication thickness without any depletion.

Time period $t_2$ to $t_3$ illustrates a period in which the slider is again flying over the narrow band and depleting the lubrication layer thickness. The lubrication layer thickness is depleted from an expected lubrication thickness without any depletion to a depleted state equaling the minimum acceptable lubrication thickness. Time period $t_3$ to $t_4$ illustrates a period in which the slider continues to fly over the narrow band and deplete the lubrication layer thickness from the minimum acceptable lubrication thickness to a depleted state below the minimum acceptable lubrication thickness. The time elapsed between time $t_3$ to $t_4$ may be stored for tracking total time below the minimum acceptable lubrication thickness within a larger period of time, which may be the life of an associated disc drive assembly. At time $t_4$, the slider is no longer flying over the narrow band, thereby permitting the lubrication layer to reflow over the narrow band to achieve a steady-state where the lubrication layer is restored to the expected lubrication thickness on the storage platter without any depletion. Acceptable time spent in which the slider is flying over the narrow band and depleting the lubrication layer thickness may vary widely due to the presence of asperities and other factors, however, it is minimized to improve interface survivability.

Actual curves (or formulae) defining lubrication depletion and lubrication reflow may vary substantially from the illustration of FIG. 2. For example, the curve defining lubrication depletion may be an exponentially increasing function approaching the expected lubrication thickness on the storage platter, while the curve defining lubrication depletion may be an exponentially decreasing function approaching a lack of any substantial lubrication on the storage platter. In various implementations, the lubrication depletion and lubrication reflow formulae may include a thermal compensation factor that accounts for changes in lubricant depletion and reflow with temperature. Further, the lubrication depletion and lubrication reflow formulae may also include a head-media spacing compensation factor that accounts for changes in lubricant depletion and reflow with slider fly height.

Figure 3:
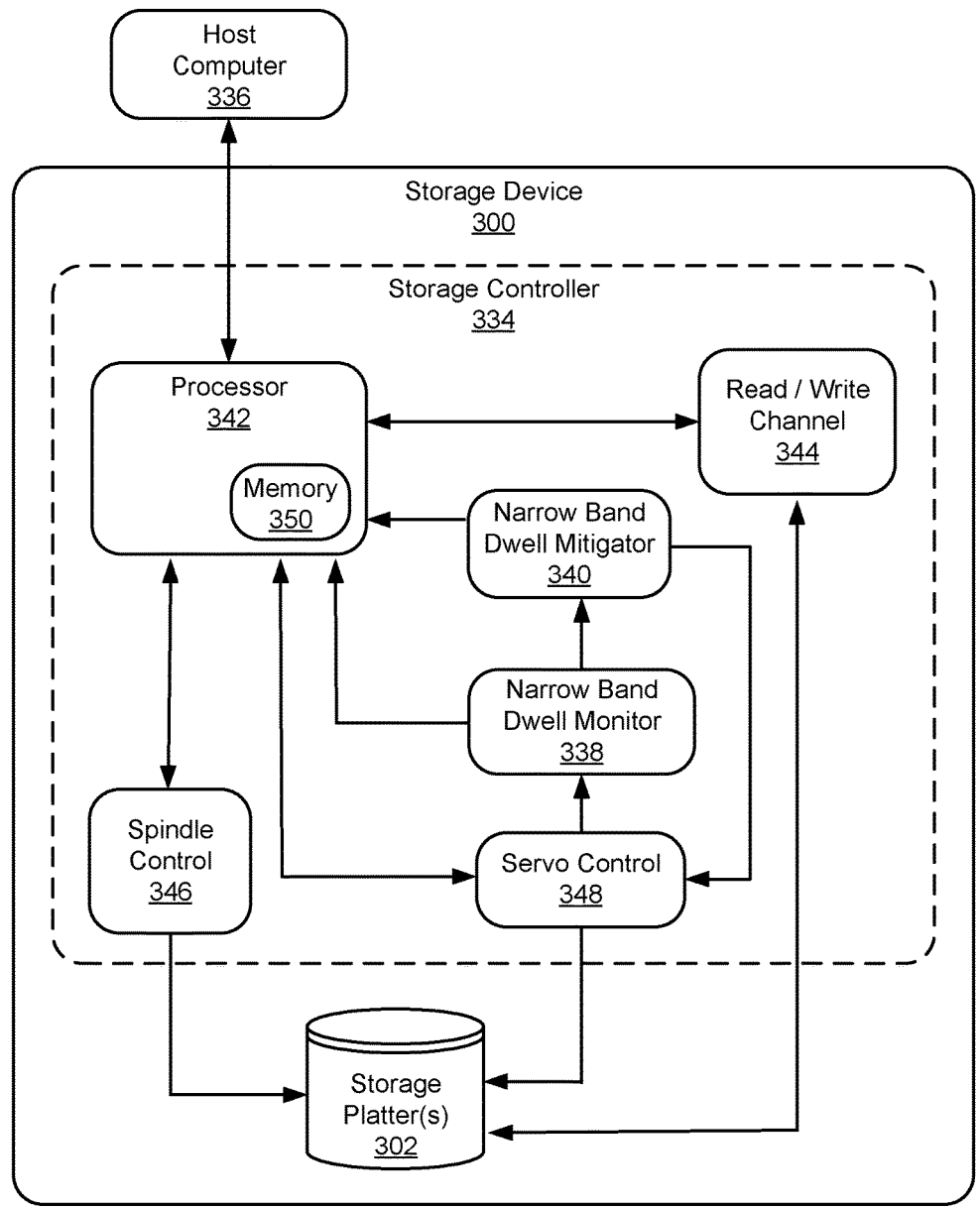
FIG. 3 illustrates an example schematic of a storage controller of a storage device implementing one or both of a narrow band dwell monitor and a narrow band dwell mitigator.

FIG. 3 illustrates an example schematic of a storage controller 334 of a storage device (or disc drive assembly) 300 implementing one or both of a narrow band dwell monitor 338 and a narrow band dwell mitigator 340. FIG. 3 illustrates functional circuits that are resident on one or more printed circuit boards used to control operation of the storage device 300. The storage controller 334 is operably and communicatively connected to a host computer 336. Control communication paths are provided between the host computer 336 and a processor 342 (in some implementations, with associated memory 350) and between the processor 342 and a set of storage platters 302 via a number of read/write channels (e.g., read and write channel 344). The processor 342 generally provides top-level communication and control for the storage controller 334 in conjunction with processor-readable instructions for the processor 342 encoded in the processor-readable storage platters 302, memory 350, or other storage media. The processor-readable instructions comprise instructions for controlling writing to and reading from data sectors on the storage platters 302. The processor-readable instructions further include instructions for monitoring narrow band dwell within the storage device 300 using the narrow band dwell monitor 338, and in some implementations, executing narrow band dwell mitigation operations using the narrow band dwell mitigator 340.

The storage controller 334 controls data stored to and read from the set of storage platters 302 by manipulating rotation of the storage platters and relative position of sliders containing transducer heads (not shown) with reference to the storage platters 302. A spindle motor control circuit 346 controls rotation of the storage platters 302, while a servo motor control circuit 348 controls angular position of actuator (and/or micro-actuator) arms that move the sliders between data tracks on the set of storage platters 302 and controls relative positions of corresponding transducer heads.

In various implementations, the narrow band dwell monitor 338 tracks slider position within the storage device 300 by monitoring the servo motor control circuit 348. A lubrication depletion and reflow model (see e.g., lubrication depletion and reflow model 200 of FIG. 2) is applied to each of a set of narrow bands defining the available surface area of each of the storage platters 302 for reading data from and writing data to the storage platters 302. As described above in detail with reference to FIG. 2, a lubrication depletion formula is applied to narrow bands during periods of time when the slider(s) are flying there over and a lubrication reflow formula to the other narrow bands when the slider(s) are not flying there over. Using the lubrication depletion and lubrication reflow formulae, and the known positions of the slider(s) over time, the narrow band dwell monitor 338 estimates, tracks, and stores an estimated lubrication layer thickness for each of the tracked narrow bands of each of the tracked storage platters over time. If a modeled lubrication film thickness falls below a minimum value for one or more of the tracked narrow bands, an amount of time below the minimum thickness value may be stored and tracked for later analysis.

In various implementations, the narrow band dwell mitigator 340 may direct the processor 342 to perform a seek operation to another narrow band or to a parked location (or unload the associated air-bearing slider) on the storage platter(s) 302 if the estimated lubrication film thickness (as defined by the narrow band dwell monitor 338) falls below a minimum value, or the estimated lubrication film thickness remains below the minimum value for a specified time period. In other implementations, the narrow band dwell mitigator 340 may direct a seek operation to another narrow band or to parked location on the storage platter(s) 302 if a maximum period of time between subsequent seek operations is exceeded. In still further implementations, the narrow band dwell mitigator 340 may direct the processor 342 to make a change in overall drive processing (i.e., a drive processing alteration) that de-emphasizes the depleted narrow band in preference for another narrow band within the storage platter(s) 302.

The narrow band dwell mitigator 340 may further implement a servo-seek watchdog timer to track time the slider spends overflying each of the tracked narrow bands, both within a continuous period and discontinuously within a predetermined time span (e.g., a projected life of the storage device 300). Any seek operation may reset the timer, but the narrow band dwell mitigator 340 may store data including values recorded from the timer.

Other configurations of the storage controller 334 are contemplated herein. For example, the storage controller 334 may include interface circuitry, buffer(s), associated device peripheral hardware, encryption unit(s), compression unit(s), etc. Further, the processor-readable instructions may also be included on processor-readable storage media within the host computer 336, the memory 350, storage platter(s) 302, or elsewhere within the storage device 300. The term "processor-readable storage media" includes but is not limited to, random access memory (RAM), read-only memory (ROM), electrically erasable programmable read-only memory (EEPROM), flash memory, compact disc read-only memory (CD-ROM), digital versatile discs (DVD), or other optical disc storage, magnetic cassettes, magnetic tape, magnetic disc storage or other magnetic storage devices, or any other tangible medium which can be used to store the desired information and which can be accessed by the processor 342. In contrast to tangible processor-readable storage media, intangible processor-readable communication signals may embody processor-readable instructions, data structures, program modules or other data resident in a modulated data signal, such as a carrier wave or other signal transport mechanism. While the system for management of system files on the storage device 300 is disclosed herein in context of a disc drive assembly (or hard disc drive), one or more aspects the technology disclosed herein may also be applicable to other storage devices, including those enumerated above.

For purposes of this description and meaning of the claims, the term "memory" means a tangible data storage device (e.g., storage device 300), including non-volatile memories (e.g., flash memory) and volatile memories (e.g., dynamic random-access memory), within storage platter(s) 302 and/or memory 350. Computer-readable instructions either permanently or temporarily reside in the memory 350, along with other information such as data, virtual mappings, operating systems, applications, and the like that are accessed by the host computer 336 to perform the desired functionality. The term "memory" expressly does not include a transitory medium such as a carrier signal, but the computer instructions can be transferred to the memory 350 wirelessly.

Figure 4:
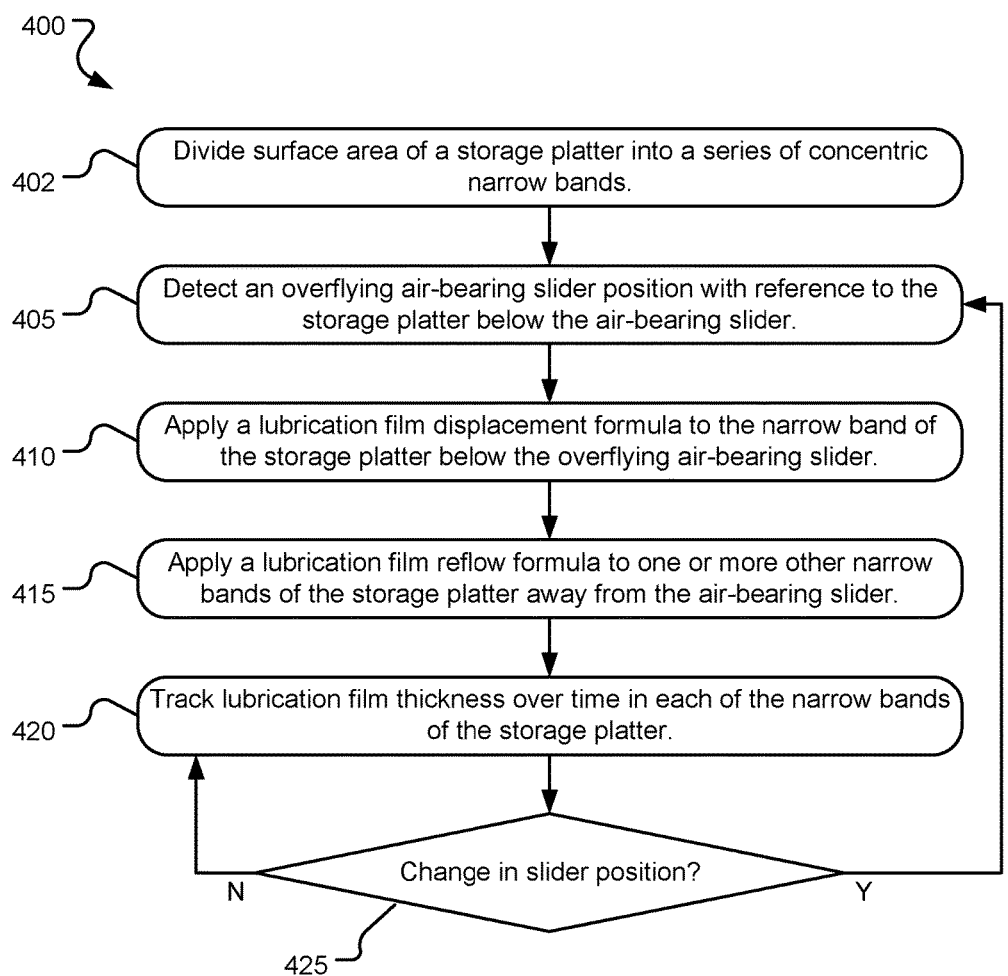
FIG. 4 illustrates example operations for monitoring narrow band dwell within a hard disc drive.

FIG. 4 illustrates example operations 400 for monitoring narrow band dwell within a hard disc drive. A dividing operation 402 divides the entire surface area available for reading data from and writing data to a storage platter into a series of concentric and adjacent narrow bands. The dividing operation 402 may be a purely logical division, with no physical demarcations between adjacent narrow bands.

A detecting operation 405 detects an overflying air-bearing slider position with reference to a storage platter below the air-bearing slider. In various implementations, the detecting operation 405 monitors angular position of an actuator arm and/or angular position of micro-actuators within the actuator arm to determine and track slider position with respect to the storage platter. In some implementations, the detecting operation 405 monitors a servo motor control circuit, which in turn controls the angular position of the actuator (and/or the micro-actuator) arms. The detecting operation 405 assigns the detected air-bearing slider position to at least one of the previously defined narrow bands of the storage platter.

An applying operation 410 applies a lubrication film displacement formula to a narrow band of the storage platter below the overflying air-bearing slider. The lubrication film displacement formula is predefined and applied only to the narrow band(s) affected by the overflying air-bearing slider. A second applying operation 415 applies a lubrication film reflow formula to one or more other narrow bands of the storage platter away from the air-bearing slider. The lubrication film reflow formula is also predefined and applied to all other narrow band(s) not affected by the overflying air-bearing slider.

A tracking operation 420 tracks lubrication film thickness over time in each of the narrow bands of the storage platter based on the applied displacement and reflow formulae. The tracking operation 420 may be implemented by storing lubrication film thickness over time within a series of tables, each table corresponding to one of the previously defined narrow bands of the storage platter. In some implementations, the tracking operation 420 may also track whether one or more micro-actuators within the slider are on or off while overflying the storage platter. The lubrication film displacement formula may differ depending upon whether the micro-actuator(s) are on or off, or the lubrication film displacement formula may only be applied when the micro-actuators are on, for example. In other implementations, the tracking operation 420 may track head-media separation directly or indirectly using other monitoring devices over time in each of the narrow bands of the storage platter.

Further, the tracking operation 420 may also track continuous time (i.e., time between seek operations) and/or cumulative time (i.e., overall time) the slider flies above each of the narrow bands of the storage platter independently of the tracked lubrication film thickness. A remaining hard disc drive life may be estimated by reviewing total time that each air-bearing slider has been overflying each of the narrow bands and comparing the total times to estimated lifespans of the narrow bands based on total time spent reading data from and/or writing data to the narrow bands.

In some instances, a minimum lubrication film thickness value is predetermined and compared to the estimated lubrication film thickness within each of the narrow bands. In some implementations, once the minimum lubrication film thickness value is reached, narrow band dwell mitigation operations are performed (see e.g., operations 500 of FIG. 5). Further, the tracking operation 420 may also track total time each narrow band spends below the minimum lubrication film thickness value and/or number of occurrences (or quantity of events) that the estimated lubrication film thickness has fallen below the minimum lubrication film thickness value.

A decision operation 425 determines if a change in slider position has occurred. If not, the tracking operation 420 continues to track lubrication film thickness over time in each of the narrow bands of the storage platter by applying the lubrication film displacement formula to the narrow band(s) affected by the overflying air-bearing slider and by applying the lubrication film reflow formula to the remaining narrow bands. If a change in slider position has occurred, the detecting operation 405 repeats to detect a new overflying air-bearing slider position with respect to the storage platter and the remaining operations 400 are repeated using the newly detected overflying air-bearing slider position.

Figure 5:
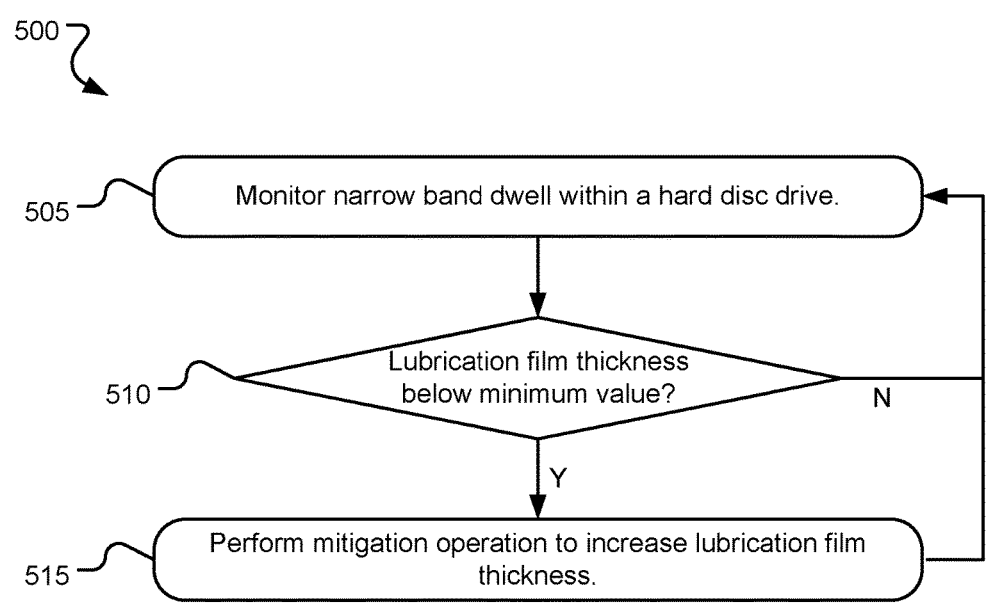
FIG. 5 illustrates example operations for mitigating narrow band dwell within a hard disc drive.

FIG. 5 illustrates example operations 500 for mitigating narrow band dwell within a hard disc drive. A monitoring operation 505 monitors narrow band dwell within the hard disc drive. In some implementations, the monitoring operation 505 is a combination of operations 400 of FIG. 4, which monitor an overflying air-bearing slider position with respect to a storage platter there below. A decision operation 510 determines if lubrication film thickness has fallen below a predetermined minimum value within one or more of the narrow bands of the hard disc drive. If not, the monitoring operation 505 continues to monitor narrow band dwell within the hard disc drive.

If so, mitigation operation 515 is performed to increase lubrication film thickness at least within the narrow band below the predetermined minimum lubrication film thickness value. In an example implementation, the mitigation operation 515 creates an overriding track command that causes an actuator arm to move the slider away from the narrow band that has reached (or fallen below) the predetermined minimum lubrication film thickness value or spent a predetermined time below the predetermined minimum lubrication film thickness value. In another example implementation, the mitigation operation 515 causes an increase in slider fly height when a narrow band that has reached (or fallen below) the predetermined minimum lubrication film thickness value or spent a predetermined time below the predetermined minimum lubrication film thickness value.

In other implementations, if cumulative and/or continuous time within each of the narrow bands of the storage platter are tracked independently of the tracked lubrication film thickness, the decision operation 510 may further trigger the mitigation operation 515 if the cumulative and/or continuous time within a narrow band of the storage platter exceeds a predetermined maximum value.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above operations may be implemented in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system implemented process.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method for monitoring narrow band dwell within a hard disc drive comprising:
   detecting an overflying air-bearing slider position with respect to a storage platter below the air-bearing slider;
   applying a lubrication film displacement formula to a narrow band of the storage platter below the overflying air-bearing slider;
   applying a lubrication film reflow formula to one or more other narrow bands of the storage platter away from the air-bearing slider;
   tracking lubrication film thickness over time in the narrow bands of the storage platter based on the applied displacement and reflow formulae; and
   performing one or more of a seek operation, a drive processing alteration, and a slider fly height alteration in response to tracked lubrication film thickness of a narrow band of the storage platter affected by the overflying air-bearing slider falling below a minimum value.

2. The method of claim 1, wherein the detecting the overflying air-bearing slider position includes monitoring an angular orientation of an actuator arm suspending the air-bearing slider over the storage platter.

3. The method of claim 1, further comprising:
   logically dividing a surface area of the storage platter into a series of concentric narrow bands for tracking lubrication film thickness over time.

4. The method of claim 3, wherein the lubrication film displacement formula is applied to one or more of the series of concentric narrow bands and the lubrication film reflow formula is applied to all others of the series of concentric narrow bands.

5. The method of claim 1, further comprising:
   tracking one or both of cumulative time and continuous time the air-bearing slider overflies the narrow band of the storage platter.

6. The method of claim 1, further comprising:
   tracking a quantity of events where a lubrication film thickness value of the narrow band falls below a minimum value.

7. The method of claim 1, wherein the performing operation is limited to the seek operation.

8. The method of claim 1, further comprising:
   performing a seek operation when a time elapsed between seek operations exceeds a predetermined maximum value.

9. The method of claim 1, wherein the performing operation is limited to the slider fly height alteration.

10. The method of claim 1, wherein one or both of the lubrication film displacement formula and the lubrication film reflow formula includes a thermal compensation factor.

11. The method of claim 1, wherein one or both of the lubrication film displacement formula and the lubrication film reflow formula includes a head-media spacing compensation factor.

12. A hard disc drive comprising:
a storage platter;
an overflying air-bearing slider;
a narrow band dwell monitor to:
    detect an air-bearing slider position with respect to the storage platter;
    apply a lubrication film displacement formula to a narrow band of the storage platter below the overflying air-bearing slider;
    apply a lubrication film reflow formula to one or more other narrow bands of the storage platter away from the overflying air-bearing slider; and
    track lubrication film thickness over time in the narrow bands of the storage platter based on the applied displacement and reflow formulae; and
a narrow band mitigator to perform one or more of a seek operation, a drive processing alteration, and a slider fly height alteration in response to tracked lubrication film thickness of a narrow band of the storage platter affected by the overflying air-bearing slider falling below a minimum value.

13. The hard disc drive of claim 12, wherein the narrow band dwell mitigator is limited to perform the seek operation.

14. The hard disc drive of claim 12, the narrow band dwell mitigator to further perform one or both of a seek operation and an unloading operation when a time elapsed between seek operations exceeds a predetermined maximum value.

15. One or more non-transitory computer-readable storage media encoding computer-executable instructions for executing on a computer system a computer process that monitors narrow band dwell in a hard disc drive, the computer process comprising:
    detecting an overflying air-bearing slider position with respect to a storage platter below the air-bearing slider;
    applying a lubrication film displacement formula to a narrow band of the storage platter below the overflying air-bearing slider;
    applying a lubrication film reflow formula to one or more other narrow bands of the storage platter away from the air-bearing slider;
    tracking lubrication film thickness over time in the narrow bands of the storage platter based on the applied displacement and reflow formulae; and
    performing one or more of a seek operation, a drive processing alteration, and a slider fly height alteration in response to tracked lubrication film thickness of a narrow band of the storage platter affected by the overflying air-bearing slider falling below a minimum value.

16. The non-transitory computer-readable storage media of claim 15, wherein the computer process further comprises:
    logically dividing a surface area of the storage platter into a series of concentric narrow bands for tracking lubrication film thickness over time.

17. The non-transitory computer-readable storage media of claim 16, wherein the lubrication film displacement formula is applied to one or more of the series of concentric narrow bands and the lubrication film reflow formula is applied to all others of the series of concentric narrow bands.

18. The non-transitory computer-readable storage media of claim 15, wherein the computer process further comprises:
    tracking one or both of cumulative time and continuous time the air-bearing slider overflies the narrow band of the storage platter.

19. The non-transitory computer-readable storage media of claim 15, wherein the computer process further comprises:
    tracking a quantity of events where a lubrication film thickness value of the narrow band falls below a minimum value.

20. The method of claim 1, further comprising:
altering slider fly height when a time elapsed between seek operations exceeds a predetermined maximum value.

* * * * *